United States Patent [19]

Bennett et al.

[11] Patent Number: 4,649,010
[45] Date of Patent: * Mar. 10, 1987

[54] METHOD OF MAKING A REMOTE CONTROL ASSEMBLY (SWIVEL INSERT)

[75] Inventors: William G. Bennett, Troy; Arthur L. Spease, Livonia, both of Mich.

[73] Assignee: Teleflex Incorporated, Limerick, Pa.

[ * ] Notice: The portion of the term of this patent subsequent to Sep. 7, 1999 has been disclaimed.

[21] Appl. No.: 696,992

[22] Filed: Jan. 31, 1985

Related U.S. Application Data

[60] Continuation-in-part of Ser. No. 409,495, Aug. 19, 1982, abandoned, which is a division of Ser. No. 170,888, Jul. 21, 1980, Pat. No. 4,380,178.

[51] Int. Cl.$^4$ .............................................. B29D 31/00
[52] U.S. Cl. .................. 264/242; 29/441 R; 156/70; 156/294; 264/262
[58] Field of Search ............. 264/242, 262; 29/441 R; 156/70, 294

[56] References Cited

U.S. PATENT DOCUMENTS 3,013,443 12/1961 Morse ................................ 74/501 P
3,395,551 8/1968 Morse ................................ 74/501 P
3,994,185 11/1976 Gilari ................................ 74/501 P
4,304,149 12/1981 Iteiman ............................. 74/501 P
4,325,904 4/1982 Frankhouse ........................ 264/242
4,348,348 9/1982 Bennett et al. ..................... 264/279

Primary Examiner—James Derrington
Attorney, Agent, or Firm—Reising, Ethington, Barnard, Perry & Milton

[57] ABSTRACT

A motion transmitting remote control assembly of the type for transmitting motion in a curved path including a flexible motion transmitting core element, a conduit for supporting the core element and an end fitting disposed at the end of the conduit. A rod is attached to the end of the core element. The assembly also includes a swivel tube having a bore therethrough for swiveling movement relative to the end fitting and for movably supporting the rod. The swivel tube is connected to the end fitting in a swivel joint. The assembly is characterized by the swivel joint including a male swivel portion of the swivel tube and including a cup-shaped insert engaging the male swivel portion at least beyond the front face thereof. The end fitting encapsulates the end of the conduit and the insert and the remainder of the male swivel portion on the swivel tube. A method of making the motion transmitting remote control assembly is also disclosed. The method includes the steps of plugging the bore of the swivel tube contiguous with the passageway of the cup-shaped insert with the cup-shaped insert engaging the male swivel portion to prevent entry of material into the bore of the swivel tube past the front face thereof, placing the swivel tube into a mold cavity, and injecting organic polymeric material into the cavity for molding the fitting about the male swivel portion and the cup-shaped insert.

5 Claims, 2 Drawing Figures

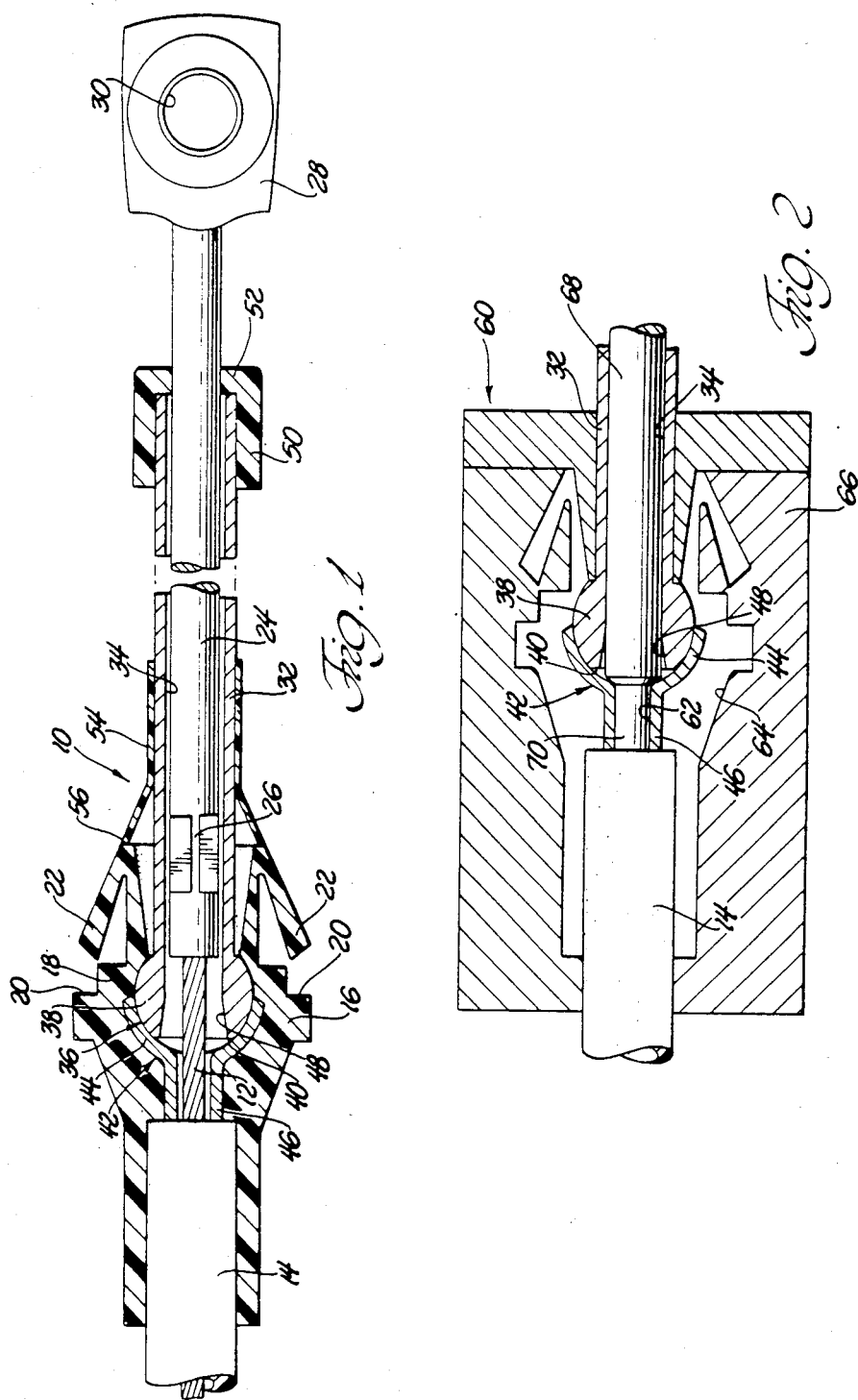

METHOD OF MAKING A REMOTE CONTROL ASSEMBLY (SWIVEL INSERT)

This is a continuation-in-part of Ser. No. 409,495, filed Aug. 19, 1982, now abandoned, which is a division of Ser. No. 170,888, filed July 21, 1980, now U.S. Pat. No. 4,380,178.

TECHNICAL FIELD

The subject invention relates to a motion transmitting remote control assembly of the type for transmitting motion in a curved path by a flexible motion transmitting core element.

BACKGROUND ART

The prior art includes various motion transmitting push-pull assemblies including a conduit supported by an end fitting. Generally, a swivel tube or sleeve can be secured to the end fitting at a swivel joint for supporting a rod therein. Various problems have been encountered with these assemblies. A major problem has been the construction of the swivel joint wherein bind occurs between the core element and the swivel tube. Other problems have been encountered during the injection mold process wherein a mandrel is generally used to plug the bore of the swivel tube and conduit during the mold process. Frequently, injection pressure forces the conduit from the end of the swivel tube resulting in flash around the opening thereof. The flash is expensive to remove and results in bind of the slidable core element when the swivel tube is pivoted through its design limits.

The instant invention provides a solution to the above problem by including a cup-shaped insert which engages the male portion of the swivel tube so as to prevent plastic melt from entering the aperture of the swivel tube during the molding process.

STATEMENT OF THE INVENTION

The instant invention provides a motion transmitting remote control assembly of the type for transmitting motion in a curved path by a flexible motion transmitting core element. The assembly includes a flexible motion transmitting core element, a conduit for supporting the core element and an end fitting disposed at the end of the conduit. The core element extends from the conduit and a rod is attached to the end of the core element. The assembly further includes a swivel tube having a bore therethrough for swiveling movement relative to the end fitting and movably supporting the rod. The swivel tube is connected to the end fitting at a swivel joint. The assembly is characterized by the swivel joint including a male swivel portion of the swivel tube having a partially convex circular surface extending from its intersection with the exterior of the swivel tube to the front end face of the swivel tube. The swivel joint also includes a cup-shaped insert engaging the convex spherical surface at least beyond the front end face. The end fitting encapsulates the end of the conduit and the insert and the remainder of the convex circular surface of the swivel tube.

A method of making the motion transmitting remote control assembly is also disclosed and includes the steps of inserting a portion of the convex surface of the male swivel portion within the cup-shaped portion of the cup-shaped insert and disposing the guide means about the male swivel portion and to cup-shaped insert and the end portion of the conduit to encapsulate the end of the conduit and the cup-shaped insert and the remainder of the convex spherical surface of the swivel tube.

FIGURES IN THE DRAWINGS

Other advantages of the present invention will be readily appreciated as the same becomes understood by reference to the following detailed description when considered in connection with the accompanying drawings wherein:

FIG. 1 is a longitudinal view partially in cross section showing a preferred embodiment of the motion transmitting remote control assembly of the subject invention; and FIG. 2 is a cross sectional view showing a mold assembly for making the preferred embodiment of the motion transmitting remote control assembly.

DETAILED DESCRIPTION OF THE DRAWINGS

A motion transmitting remote control assembly of the type for transmitting motion in a curved path by a flexible motion transmitting core element constructed in accordance with the instant invention is generally shown at 10 in FIG. 1. The assembly 10 includes a flexible motion transmitting core element 12 in the form of a cable and a flexible conduit 14 for supporting the core element 12. The conduit may be of the type well known in the art including a plastic inner tube surrounded by a plurality of helically disposed long lay wires surrounded by a plastic outer casing. Guide means, such as an end fitting 16 is disposed at the end of the conduit 14.

The end fitting 16 is adapted to support the assembly 10 through an aperture of a support structure. The end fitting includes a body portion 18 and an abutment portion 20 for abutting the support structure at one extremity of the aperture therein to prevent the end fitting 16 from moving through the aperture. The end fitting 16 also includes a pair of flexible legs 22 extending towards the abutment 20 in a cantilevered fashion from the body portion 18 and spaced from the abutment 20 for moving through the aperture as the end fitting 16 is inserted therein and for engaging the end fitting 16 at the other extremity of the aperture for retaining the end fitting 16 therein.

A rod 24 is attached to the end of the core element 12 at 26. Conventional means of attachment can be used, e.g., inserting the core element into the rod and swaging the rod down about the core element.

The rod 24 includes an end portion 28 having a hole 30 therethrough adapted for attachment to a lever. The lever may actuate the core element of the push-pull assembly or the core element may actuate the lever.

The assembly 10 further includes a swivel tube 32 having a bore 34 therethrough for swivelling movement relative to the end fitting 16. The swivel tube 32 movably supports the rod 24 within the bore 34. The swivel tube 32 is connected to the end fitting 16 at a swivel joint generally indicated at 36. The swivel joint 36 allows for the end portion 28 of the rod 24 to be secured to a pivotally moving lever.

The assembly 10 is characterized by the swivel joint 36 including a male swivel portion 38 having a partially convex spherical surface extending from its intersection with the exterior of the swivel tube 32 to the front end face 40 of the swivel tube 32. The swivel joint 36 also includes a cup-shaped insert generally indicated at 42 engaging the convex spherical surface of the male swivel portion 38 at least beyond the front end face 40. The insert 42 includes a cup-shaped portion 44 partially defining the female swivel portion of the swivel joint 36 and an integral tubular portion 46. The integral tubular portion 46 engages the end of the conduit 14. The end fitting 16 encapsulates the end of the conduit 14 and the insert 42 and the remainder of the convex spherical surface of the male swivel portion 38 on the swivel tube 32.

The end fitting 16 and the swivel tube 32 are made of an organic polymeric material. The insert 42 is made of organic polymeric material and can alternatively be made from an appropriate metallic material. As previously stated, the cup-shaped portion 44 of the insert 42 defines a portion of the female swivel portion of the swivel joint 36. Thus, the insert can be made of an appropriate material to provide a desired low friction surface for engaging the male portion 38 of the swivel tube 32.

The bore 34 of the swivel tube 32 includes a frustoconical end portion 48 tapering from a large diameter in a direction away from the front end face 40 to the smaller diameter of the bore 34. The frustoconical end portion 48 eliminates the bind on the slidable core element 12 when the swivel tube 32 is pivoted through the design limits.

A wiper cap 50 is attached to the distal end of the swivel tube 34 and is in sliding engagement with the rod 24. The wiper cap 50 includes a lip 52 abutting the distal end of the swivel tube 32 for preventing foreign substances from entering the end of the swivel tube 32 which would inhibit movement of the rod 24 within the bore 34 of the swivel tube 32. A rubber-like boot 54 is frictionally held in place about the swivel tube 32. The boot 54 abuts the end portion 56 of the end fitting 16 for preventing foreign substances from entering the swivel joint 36.

A method of making the motion transmitting remote control assembly 10 is generally shown at 60 in FIG. 2. The method includes the steps of plugging the bore 34 of the swivel tube 32 contiguous with the passageway 62 of the tubular portion 46 of the cup-shaped insert generally indicated at 42. The cup-shaped portion 44 of the cup-shaped insert 42 engages the convex surface of the male swivel portion 38 to prevent entry of material into the bore 34 past the front end face 40 thereof. The swivel tube 32 is placed into a mold cavity 64 of a mold 66. The end of the conduit 14 is placed into the cavity 64 so that the end of the conduit 14 abuts the end of the tubular portion 46 of the insert 42. The end of the conduit 14 is plugged before injecting the organic polymeric material into the cavity 64 to mold the end fitting 16 about the end of the conduit 14 and the insert 42 and the exposed portion of the male swivel portion 38 of the swivel tube 32.

A mandrel 68 with a nose 70 can be inserted into the bore 34 of the swivel tube 32 to fill and plug the smaller diameter portion of the bore 34 to prevent entry of material into the bore 34 past the front end face thereof. The nose 70 fills the passageway 62 of the tubular portion 46 of the insert 42 to prevent entry of material into the tubular portion 46 and also extends into and fills the end of the conduit 14.

The mandrel 68 cannot include an outwardly tapered portion for filling the frustoconical portion 48 of the swivel tube 32 in the absence of the insert 42 because it would then be impossible to remove the mandrel 68 once the fitting 16 is molded about the assembly 10. Furthermore, as previously stated, other problems arise during injection molding when a straight mandrel is used to plug the straight bore of a swivel tube such that the end portion of the mandrel is forced away from the front face of the swivel tube during the injection molding process resulting in a flash around the opening of the bore of the swivel tube. The cup-shaped insert 42 engages the male swivel portion 38 beyond the front end face 40 thereof so as to prevent the the injected organic polymeric material from entering the bore 34 of the swivel tube 32. Therefore, there is no flash around the opening of the bore 34 of the swivel tube 32. Also, a straight mandrel 68 can be used in the situation where the swivel tube 32 includes a frustoconical end portion 48. Therefore, the instant invention provides a means for molding an end fitting about the male portion of a swivel tube having a frustoconical bore for allowing the core element to move therewithin and eliminating bind on the core element when the swivel tube is pivoted through the design limit. Other steps may be utilized to encapsulate the insert 42 and the male swivel portion 38 within the guide means. For example, a premolded two part end fitting maybe disposed over the insert 42 and male swivel portion 38 and connected together by glue or other fastening means.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of making a motion transmitting remote control assembly (10) of the type including a conduit (14) with an end fitting (16) of organic polymeric material disposed on one end of the conduit (14) and a motion transmitting core element (12) extending through the conduit (14) and end fitting (16) with the core element (12) connected to a rod (24) movably supported in a bore (34) in a swivel tube (32), the bore (34) being conical and tapering from a large diameter from the front end (40) thereof to a small diameter and having a male swivel portion (38) with a partial convex spherical surface extending from its intersection with the exterior of the swivel tube (32) to the front end face (40) thereof and pivotally supported in a female swivel portion having a cup-shaped insert (42) disposed therein having a tubular portion (46) engaging the end of the conduit (14) and having an integral cup-shaped portion (44) engaging the male swivel portion (38) and extending at least beyond the front and end face (40) thereof, said method including the steps of; disposing the cup-shaped insert over the male swivel portion (38) and the front end (40) thereof, plugging the bore (34) of the swivel tube (32) contiguous with the passageway (62) of the tubular portion (46) of the cup-shaped insert (42) with the cup-shaped portion (44) engaging the convex surface of the male swivel portion (38) to prevent entry of material into the bore (34) past the front end face (40) thereof and to prevent entry of material into the tubular portion (46), placing the swivel tube (32) and cup-shaped insert (42) into a mold cavity (64) and injecting organic polymeric material into the cavity (64) for molding the fitting (16) about the male swivel portion (38) and the cup-shaped insert (42).

2. A method as set forth in claim 1 including placing the end of the conduit (14) into the cavity (64) so that the end of the conduit (14) abuts the end of the tubular portion (46) of the insert (42), plugging the end of the conduit (14) before injecting the organic polymeric material into the cavity (64) to mold the end fitting (16) about the end of the conduit (14).

3. A method as set forth in claim 2 including inserting a mandrel (68) with a nose (70) into the bore (34) of the swivel tube (32) to fill and plug the smaller diameter portion of the bore (34) and with the nose (70) filling the passageway (62) of the tubular portion (46) of the insert (42) and extending into the end of the conduit (14).

4. A method of making a motion transmitting remote control assembly (10) of the type including a conduit (14) having guide means disposed on one end of the conduit (14) and a motion transmitting core element (12) extending through the conduit (14) and guide means with the core element (12) connected to a rod (24) movably supported in a bore (34) of a swivel tube (32), the bore (34) being substantially conical and tapering from a large diameter from the front end thereof to a small diameter and having a male swivel portion (38) with a partial convex spherical surface extending from its intersection with the exterior of the swivel tube (32) to the front end face (40) thereof and pivotally supported in a female swivel portion including a cup-shaped insert (42) disposed therein having a tubular portion (46) engaging the end of the conduit (14) and having an integral cup-shaped portion (44) engaging the male swivel portion (38) and extending at least beyond the front end face (40) thereof, said method including the steps of: inserting a portion of the convex surface of the male swivel portion (38) within the cup-shaped portion (44) of the cup-shaped insert (42) and disposing the guide means about the male swivel portion (38) and the cup-shaped insert (42) and the end portion of the conduit (14) to encapsulate the end of the conduit (14) and the cup-shaped insert (42) and the remainder of the convex spherical surface of the swivel tube (32).

5. A method as set forth in claim 4 wherein the step of disposing the guide means is further defined as encapsulating the male swivel portion (38) and cup-shaped insert (42) and the end portion of the conduit (14) between at least two parts comprising the guide means and securing the parts together.

* * * * *